(12) United States Patent
Kuras et al.

(10) Patent No.: US 6,986,727 B2
(45) Date of Patent: Jan. 17, 2006

(54) RETARDING CONTROL FOR AN ELECTRIC DRIVE MACHINE

(75) Inventors: Brian D. Kuras, Metamora, IL (US); Thomas M. Sopko, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 5 days.

(21) Appl. No.: 10/742,997

(22) Filed: Dec. 23, 2003

(65) Prior Publication Data

US 2005/0137060 A1 Jun. 23, 2005

(51) Int. Cl.
*B60K 41/02* (2006.01)

(52) U.S. Cl. .......................................... 477/4
(58) Field of Classification Search .................. 477/4; 60/708, 711, 713, 716, 718, 719; 180/65.4
See application file for complete search history.

(56) References Cited

U.S. PATENT DOCUMENTS

| 4,423,362 | A | 12/1983 | Konrad et al. |
| 4,495,449 | A | 1/1985 | Black et al. |
| 4,845,414 | A | 7/1989 | Angelis et al. |
| 5,070,959 | A | 12/1991 | Grabowski |
| 5,103,923 | A | 4/1992 | Johnston et al. |
| 5,291,960 | A * | 3/1994 | Brandenburg et al. ..... 180/65.2 |
| 5,351,775 | A | 10/1994 | Johnston et al. |
| 5,492,192 | A * | 2/1996 | Brooks et al. .............. 180/165 |
| 5,608,308 | A * | 3/1997 | Kiuchi et al. .................. 322/11 |
| 5,708,334 | A | 1/1998 | Schreiber et al. |
| 5,818,185 | A | 10/1998 | Freitag et al. |
| 5,839,533 | A * | 11/1998 | Mikami et al. ............. 180/165 |
| 5,875,864 | A * | 3/1999 | Yano et al. ................ 180/65.4 |
| 5,954,779 | A | 9/1999 | Dietzel |
| 6,047,787 | A | 4/2000 | Deng et al. |
| 6,116,368 | A * | 9/2000 | Lyons et al. ................ 180/165 |
| 6,127,791 | A | 10/2000 | Strunk |
| 6,205,405 | B1 | 3/2001 | Pouvreau |
| 6,285,961 | B1 | 9/2001 | Jahkonen et al. |
| 6,313,592 | B1 | 11/2001 | Voss et al. |
| 6,318,487 | B2 * | 11/2001 | Yanase et al. ............. 180/65.2 |

* cited by examiner

*Primary Examiner*—Dirk Wright
(74) *Attorney, Agent, or Firm*—Finnegan, Henderson, Farabow, Garrett & Dunner LLP

(57) ABSTRACT

A method of dissipating power in a propelled machine having an electric drive includes converting undesired power to electric power by the electric drive, and driving an internal combustion engine with at least a portion of the electric power prior to substantially dissipating power with any other power dissipating device.

22 Claims, 3 Drawing Sheets

RETARDING CONTROL FOR AN ELECTRIC DRIVE MACHINE

TECHNICAL FIELD

This invention relates to electric drive systems for propelled machines, and more particularly to retarding control for propelled machines having an electric drive.

BACKGROUND

Conventional propelled machines may generally include an internal combustion engine that is mechanically coupled through a transmission assembly and drivetrain to the driven wheels or sprockets of the machine. In contrast, propelled machines having electric drive systems include an internal combustion engine that is mechanically coupled to drive a generator that creates electrical power. The power from the generator is then consumed by a motor that is mechanically coupled to drive the wheels or sprockets of the propelled machine. Accordingly, the generator and motor of the electric drive systems can replace the mechanical transmission and drivetrain of conventional internal combustion engine driven machines. This may result in a propelled machine with superior drivetrain efficiency and improved propulsion performance, which correlates to a machine having greater fuel economy and reduced emissions.

The efficiency of the electric drive system, however, is so efficient that the retarding performance of the propelled vehicle becomes an issue. Retarding performance of a propelled machine relates to the capability of the propelled machine to dissipate undesired power or energy. Such undesired power may include the power of the machine when moving at an undesired speed and/or direction. For example, undesired power of the machine can result from travel down a incline, or exist just after the initiation of a directional shift of the machine from a reverse direction to a forward direction, or visa versa.

Conventional propelled machines having mechanical transmissions and drivetrains dissipate portions of undesired power as heat by way of mechanical clutches, torque converters and the engine. In contrast, the electric generator and electric motor of an electric drive machine are extremely efficient components, and thus, by themselves, do not dissipate undesired power well.

U.S. Pat. No. 5,954,799 to Bernd Dietzel ("the '799 patent") discloses a propelled vehicle having a process for influencing the drag torque of an electric drive system. The process includes the use of an electric drive system having a reversible generator and two reversible electric motors. The electric motors can act as generators and produce electrical power in response to energy acting to rotate the tires of the machine. The generated electrical power may then be supplied to the generator, which can then act as a motor to drive the internal combustion engine. The driving of the internal combustion engine by the generator at a speed of rotation equal to an idling speed of the engine serves to improve the fuel efficiency of the vehicle by obviating the need to inject fuel into the engine.

The '799 patent is generally directed to maintaining a desired speed of the vehicle, but does not disclose maximizing the possible drag torque of the electric drive system in the instance of complete braking of the vehicle or a complete hierarchy of power dissipating devices. Accordingly, the '799 patent does not provide, for example, a complete retarding strategy for dissipating undesired power in a propelled machine having an electric drive.

The present invention avoids some or all of the aforesaid shortcomings in the prior art.

SUMMARY OF THEE INVENTION

In accordance with one aspect of the invention, a method of dissipating power in a propelled machine having an electric drive includes converting undesired power to electric power by the electric drive and driving an internal combustion engine with at least a portion of the electric power prior to substantially dissipating power with any other power dissipating device.

According to another aspect of the present invention, a method of dissipating power in a propelled machine having an electric drive includes converting undesired power to electric power by the electric drive and driving an internal combustion engine with at least a first portion of the electric power. The method further includes providing a second portion of the electric power to at least one of an energy storage component and an electric powered accessory of the propelled machine, the second portion corresponding to electric power exceeding a predetermined dissipation limit of the internal combustion engine. Additionally, the method includes dissipating undesired power by an application of at least one brake of the propelled machine.

According to another aspect of the present invention, a method of dissipating undesired power in a propelled machine having an electric drive includes driving an internal combustion engine by the undesired power, providing undesired power to at least one of an energy storage component and an electric powered accessory of the propelled machine, and applying at least one brake of the propelled machine.

According to yet another aspect of the present invention, a propelled machine includes a first means for dissipating undesired power, a second means for dissipating undesired power, and a third means for dissipating undesired power. The propelled machine also includes an electric drive and a controller configured to prioritize the use of one of the first, second, and third dissipating means so that the dissipating means having the highest priority dissipates power to a predetermined limit if more than one dissipating means is required.

It is to be understood that both the foregoing general description and the following detailed description are exemplary and explanatory only and are not restrictive of the invention, as claimed.

DETAILED DESCRIPTION

Reference will now be made in detail to the drawings. Whenever possible, the same reference numbers will be used throughout the drawings to refer to the same or like parts.

Figure 1:
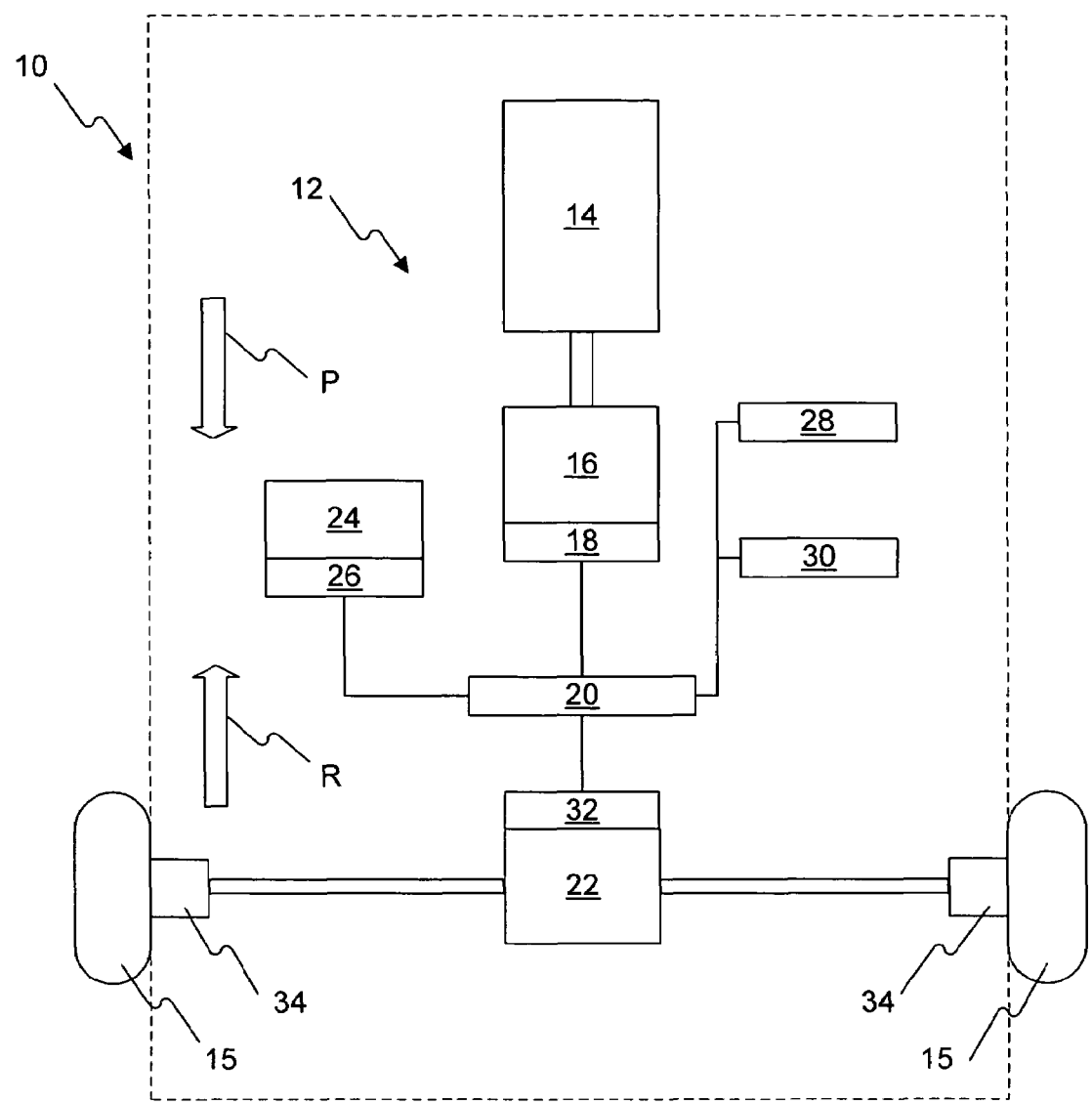
FIG. 1 illustrates a schematic representation of an electric drive system for a propelled machine in accordance with an exemplary embodiment of the present disclosure.

FIG. 1 schematically illustrates a propelled machine 10 having an electric drive 12 in accordance with an exemplary embodiment of the present disclosure. The electric drive 12 may be used in any type of machine having wheels or sprockets 15 for propelling the propelled machine 10. For example, the electric drive 12 may be used on a dozer machine having tracks propelled by sprockets 15 coupled to the electric drive 12.

As illustrated in FIG. 1, the electric drive 12 may include an internal combustion engine 14 coupled to provide power to an electric generator 16. The generator 16 may be include power electronics 18 and supply generated current to a direct current bus 20 and one or more electric motors 22. Additionally, the DC bus 20 may be coupled to a resistive grid 24 having associated power electronics 26, to an energy storage component 28, and to electric powered accessories 30 of the propelled machine 10. The electric motor 22 may also include power electronics 32, and may be mechanically coupled to provide a driving force to wheels or sprockets 15 of the machine 10. Brakes 34 may be coupled to each wheel or sprocket 15.

The internal combustion engine 14 may be of any conventional type and size. For example, internal combustion engine 14 may be a diesel, gasoline, or natural gas driven engine. All such alternative configurations of the internal combustion engine 14 may be generally referred to as engine means. As noted above, internal combustion engine 14 may be configured to drive the electric generator 16. In addition, the internal combustion engine 14 may be mechanically coupled to drive a number of other components of the propelled machine 10. For example, internal combustion engine 14 may be mechanically coupled to drive one or more hydraulic pumps, one or more water pumps, a fan, and/or an alternator of the propelled machine 10.

The electric generator 16 may be of any appropriate type, for example, AC induction, switched reluctance, or permanent magnet type. As will be described in more detail below, electric generator 16 may be configured with reverse power capability to enable it to operate as an electric motor for powering the internal combustion engine 14. Additionally, the electric generator 16 may include appropriate power electronics 18. The power electronics 18, may include, for example, appropriate hardware and software for controlling the operation of the electric generator 16, as is known in the art.

The direct current bus 20 of propelled machine 10 may include an electrical storage device at a given voltage level. Accordingly, the DC bus 20 may be configured so as to appropriately carry and distribute the electric power produced by the operation of the electric drive 12. For example, the DC bus 20 may be appropriately configured to receive the power produced by the electric generator 16 and, as will be described in more detail below, the power produced by the electric motor 22 when the electric motor 22 is operating as a generator.

As noted above, the DC bus 20 may be coupled to a resistive grid 24. Resistive grid 24 may be configured to convert electricity into heat by, for example, controlling the current across a power resistor. Due to the high temperatures that may be created by the power resistor, the resistive grid 24 may include an appropriate air or liquid cooling system (not shown). The resistive grid 24 may be triggered into operation by intentionally creating a voltage rise in the DC bus 20 by creating a power differential between the electric motor 22 and electric generator 16. As understood, the resistive grid 24 may include any number of alternative configurations including or not including a power resistor, as long as the configuration serves a primary purpose of converting undesired electrical power into heat. All such alternative configurations may be generally referred to as resistive grid means.

The energy storage component 28 may be of any conventional type for storing electrical energy. For example, energy storage component 28 may include one or more capacitors and/or batteries appropriately connected and having appropriate control electronics. Additionally, the electric power accessories 30 may include all or some of the components of the propelled machine 10 that require electrical power.

The electric motor 22 and corresponding power electronics 32 may be configured to adequately handle the required power of the propelled machine 10. Similar to the electric generator 16, electric motor 22 may be configured with reverse power capability to enable it to operate as a generator for creating electrical power. The power electronics 32 of the electric motor 22, may include appropriate hardware and software for controlling the operation of the electric motor 22, as is known in the art.

The brakes 34 may be of any conventional type having variable control. For example, brakes 34 may be mechanically or hydraulically actuated by an appropriate mechanical or fluid control system, or may be in the form of a hydraulic retarder. All such alternative configuration of the brakes 34 may be generally referred to as brake means. During application of the brakes 34, power of the machine is dissipated from the brakes 34 in the form of released heat. Accordingly, the brakes 34 may require an appropriate cooling system. The brakes 34 may be the primary braking system for the propelled machine 10, or may be a supplemental system for use solely or primarily in connection with the retarding strategy of the present disclosure.

During propulsion of the propelled machine 10 by the electric drive 12, the internal combustion engine 14 combusts fuel to drive the electric generator 16. The electric generator 16, in turn, produces electrical power that is provided to the DC bus 20. The DC bus 20 then provides electrical power to the various electric powered accessories 30 as needed, and to the electric motor 22 to drive the wheels or sprockets 15. The general flow of power created during propulsion by the electric drive 12 is indicated by arrow P in FIG. 1.

The propelled machine 10 is also capable of retarding or dissipating undesired power/energy. Such undesired power may be in the form of power added to the propelled machine 10 based on its travel down an incline, or in the form of movement of the propelled machine 10 in a slower desired speed than actual. The retarding process associated with these two categories of undesired power is generally referred to as downhill retarding and directional shift retarding, respectively. It is understood that the terms "energy" and "power" are referred to herein interchangeably, in that power is merely the time derivative of energy.

The propelled machine 10 provides a retarding process wherein the undesired power is dissipated all throughout the propelled machine 10. In particular, the undesired power may be dissipated through four major categories of components of the propelled machine 10; namely the internal combustion engine 14, the energy storing component 28 and/or electric powered accessories 30, the resistive grid 24, and the brakes 34. These four categories of components may include all of the alternative configurations detailed above in connection with the individual components, and may generally be referred to as a first, second, third, and fourth means for dissipating undesired power. With respect to the dissipation of undesired power through the internal combustion engine 14, the energy storing component 28 and/or electric powered accessories 30, and the resistive grid 24, the general flow of power is indicated by arrow R in FIG. 1.

During the retarding process associated with the electric drive 12, undesired power is received from the wheels or sprockets 15 and applied to electric motor 22. In this process, however, electric motor 22 operates as a generator and produces electric power. The electric power generated by the electric motor 22 is then supplied to the DC bus 20. Then, in accordance with the retarding strategy to be discussed below in connection with FIG. 2, the electrical power of the DC bus 20 is distributed to the internal combustion engine 14, energy storing component 28, electric powered accessories 30, and resistive grid 24 that dissipates the electrical power.

For example, all or a portion of the electrical energy in DC bus 20 may be distributed to the electric generator 16 (which would now operate as an electric motor) for driving the internal combustion engine 14. Upon driving the internal combustion engine 14, the undesired electrical power is dissipated by the natural engine friction, exhaust restrictors, compression release devices, and driven accessories of the engine. It is noted that driving the internal combustion engine 14 by the electric generator 16 provides fuel savings because fuel is not required keep the internal combustion engine 14 running.

Other portions of the electrical power in DC bus 20 may be supplied to the resistive grid 24 to heat up the associated power resistor. In doing so, the electrical power supplied to the resistive grid 24 is dissipated in the form of heat. As noted above, it is understood that the resistive grid 24 may require an appropriate air or liquid cooling system to keep the resistive grid 24 within its temperature limits.

In addition to the above described avenues for dissipating the electrical power provided to the DC bus 20 by the electric motor 22, the electrical power could be distributed to, and dissipated by, the electric powered accessories 30, or stored in the energy storing component 28.

As indicated above, undesired power in propelled machine 10 may also be dissipated by the brakes 34. This is achieved by activating the brakes 34, which in turn dissipate the undesired power in the propelled machine in the form of heating of the components of the brake 34. Appropriate conventional brake cooling systems may be included to maintain the brakes 34 below undesired temperatures.

Figure 2:
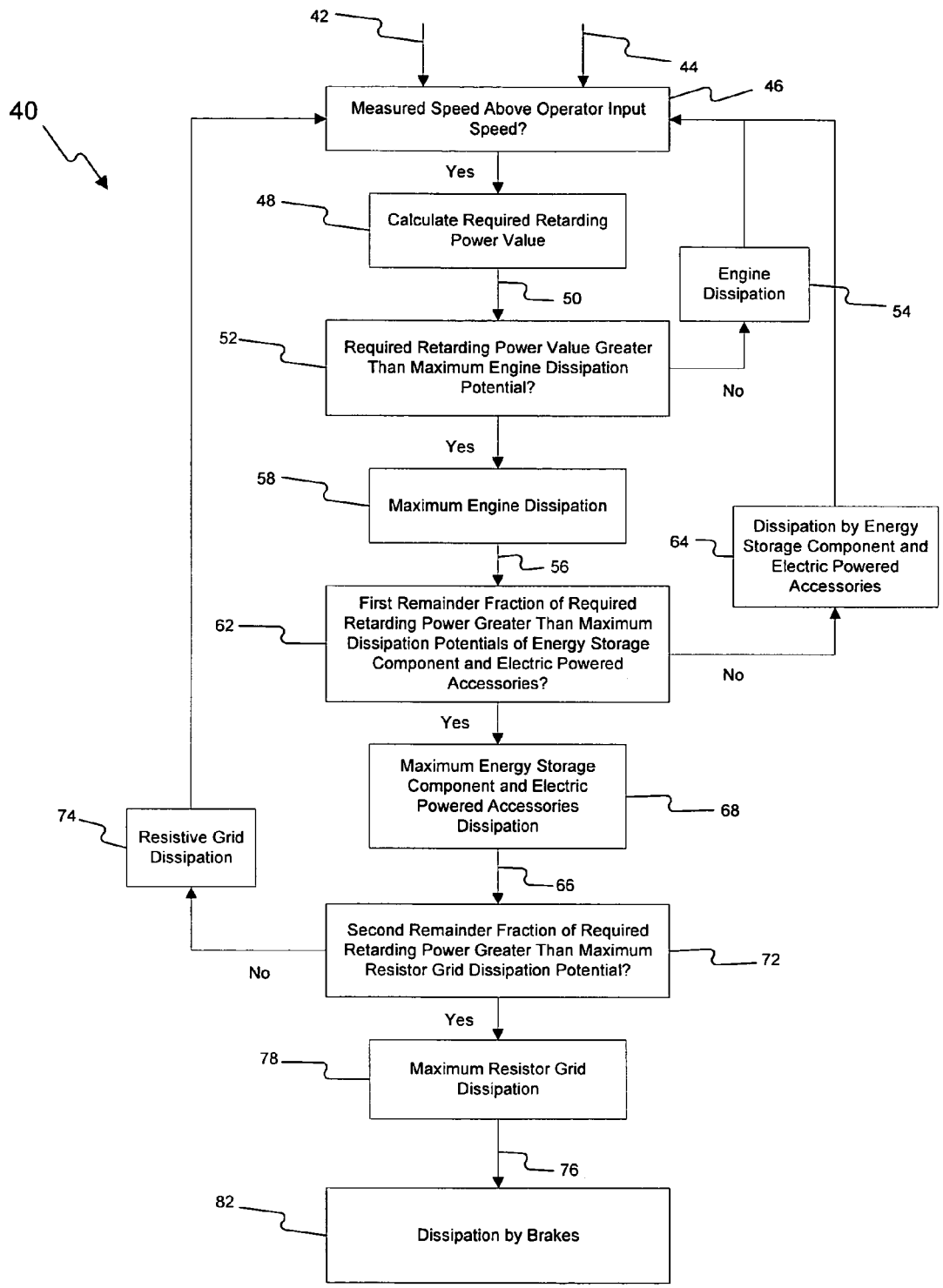
FIG. 2 is a flow diagram illustrating an exemplary retarding strategy of the present disclosure.

FIG. 2 illustrates a retarding strategy 40 in accordance with an exemplary embodiment of the present disclosure. As shown, an operator speed input 42 determines a desired speed of the propelled machine 10. The desired speed may be set by the operator by any conventional input device, for example, a foot pedal or hand control lever. The operator speed input 42 may include maintaining a particular positive speed of the propelled machine 10, decelerating to zero speed, or decelerating to zero speed and accelerating to positive speed in a direction opposite the movement of the propelled machine 10 (i.e., a directional shift from forward to reverse, or visa versa). The operator speed input 42 is then compared to a measured speed 44 of the propelled machine 10. The measured speed 44 may be obtained by any conventional manner, for example by measuring the rotational speed of shafts connected to the wheels or sprockets 15.

The comparison of the operator speed input 42 with the measured speed 44 takes place at a speed comparison box 46 in FIG. 2. If the measured speed 44 of the propelled machine 10 is sufficiently close to or less than the operator speed input 42, no retarding of the propelled machine 10 is necessary and an appropriate pause is initiated before again comparing the operator speed input 42 to the measured speed 44. If the measured speed 44 is greater than the operator speed input 42, then retarding is necessary to dissipate the undesired power associated with the additional speed.

Box 48 of FIG. 2 represents the calculation step of determining the amount of undesired power that needs to be dissipated in order to reduce the speed of the propelled machine 10 to the operator speed input 42 value. This value for the undesired power will be hereinafter referred to as a required retarding power value 50, and may be calculated by, inter alia, any appropriate microprocessor using conventional techniques.

Once the required retarding power valve 50 is determined, the retarding strategy 40 determines the best way to dissipated the retarding power throughout the propelled device 10. As illustrated in FIG. 2, the retarding strategy 40 includes a hierarchy of devices used to dissipate the retarding power. The hierarchy identifies the internal combustion engine 14 as the first dissipating device, then the electric power accessories 30 and/or the energy storage component 28, then the resistive grid 24, and finally the brakes 34.

In particular, the internal combustion engine 14 provides for dissipation of the retarding power up to that achieved when the speed limit of the internal combustion engine 14 is reached. Accordingly, the internal combustion engine 14 includes a maximum dissipating potential associated with its operation at its speed limit. Box 52 in FIG. 2 compares the required retarding power value 50 to the maximum dissipating potential of the internal combustion engine 14. If the maximum dissipating potential of the internal combustion engine 14 is greater than the required retarding power value 50, then the electric motor 22, DC bus 20 and electric generator 16 are controlled as described above to drive the internal combustion engine 14 and dissipate all of the retarding power. This step is identified with box 54 in FIG. 2. The retarding strategy 40 continuously goes back to comparing the operator speed input 42 to the measured speed 44 of the propelled device 10 in a predefined microprocessor execution timer.

If the required retarding power value 50 exceeds the maximum dissipating potential of the internal combustion engine 14, then the internal combustion engine 14 is used to dissipate the retarding power to its maximum potential (box 58 of FIG. 2), and a first remainder fraction 56 of the retarding power is provided to at least one of the electric powered accessories 30 and the energy storage component 28, the next dissipation devices in the hierarchy of the retarding strategy 40.

Similar to the internal combustion engine 14, the electric powered accessories 30 and energy storage component 28 both include maximum dissipation potentials. These maximum dissipation potentials may be associated with, for example, the temperature or voltage limits or accessory motor power ratings of the components making up the electric powered accessories 30 and energy storage component 28. Accordingly, box 62 in FIG. 2 compares the first remainder fraction 56 to the maximum dissipating potential of the electric powered accessories 30 and energy storage component 28. If the maximum dissipating potentials of the electric powered accessories 30 and energy storage component 28 are greater than the first remainder fraction 56, then the electric motor 22 and DC bus 20 are controlled as described above to provide current to the electric powered accessories 30 and energy storage component 28 to dissipate all of the first remainder fraction 56. This step is identified with box 64 in FIG. 2.

If the first remainder fraction 56 exceeds the maximum dissipating potentials of the electric powered accessories 30 and energy storage component 28, then the electric powered accessories 30 and energy storage component 28 are used to dissipate the first remainder fraction 56 to their maximum potential (box 68 of FIG. 2), and a second remainder fraction 66 of the retarding power is provided to the resistive grid 24, the next device in the hierarchy of the retarding strategy 40.

As with the other power dissipating devices, the restive grid 24 includes a maximum dissipation potential. This maximum dissipation potential may be associated with, for example, the temperature limits of the components making up the resistive grid 24. Accordingly, box 72 in FIG. 2 compares the second remainder fraction 66 to the maximum dissipating potential of the resistive grid 24. If the maximum dissipating potential of the resistive grid 24 is greater than the second remainder fraction 66, then the electric motor 22 and DC bus 20 are controlled as described above to provide current to resistive grid 24 to dissipate all of the second remainder fraction 66. This step is identified with box 74 in FIG. 2.

If the second remainder fraction 66 exceeds the maximum dissipating potential of the resistive grid 24, then the resistive grid 24 is used to dissipate the second remainder fraction 66 to its maximum potentials (box 78 of FIG. 2), and a third remainder fraction 76 of the retarding power is absorbed by the brakes 34, the next dissipation device in the hierarchy of the retarding strategy 40.

The brakes 34 completely dissipate the third remainder fraction 76, thus dissipating all of the required retarding power 50. This process is identified in box 82 of FIG. 2.

It is understood that the retarding strategy 40 is driven by an appropriate controller. Such a controller may be of any conventional design having hardware and software configured to perform the calculations and send and receive appropriate signals to perform the retarding strategy 40. The controller may include one or more controller units, and may be configured solely to perform the retarding strategy 40, or to perform the retarding strategy 40 and other processes of the propelled machine 10. The numerous various alternatives for the controller are generally referred to as controller means.

Additionally, it is understood that the maximum dissipating potential for the dissipating devices 14, 24, 28, and 30 may be fixed or variable values. For example, the maximum dissipating potential any of the dissipating devices may be continuously calculated by the controller and, for example, lowered based on the environmental temperature surrounding the propulsion machine 10.

Additionally, the control strategy 40 of FIG. 2 may be modified to (1) omit the use of the electric powered accessories 30 and energy storage component 28 as dissipating devices, (2) use only one of the electric powered accessories 30 and energy storage component 28 as dissipating devices, or (3) use both of the electric powered accessories 30 and energy storage component 28 as dissipating devices, but not at the same time.

Figure 3:
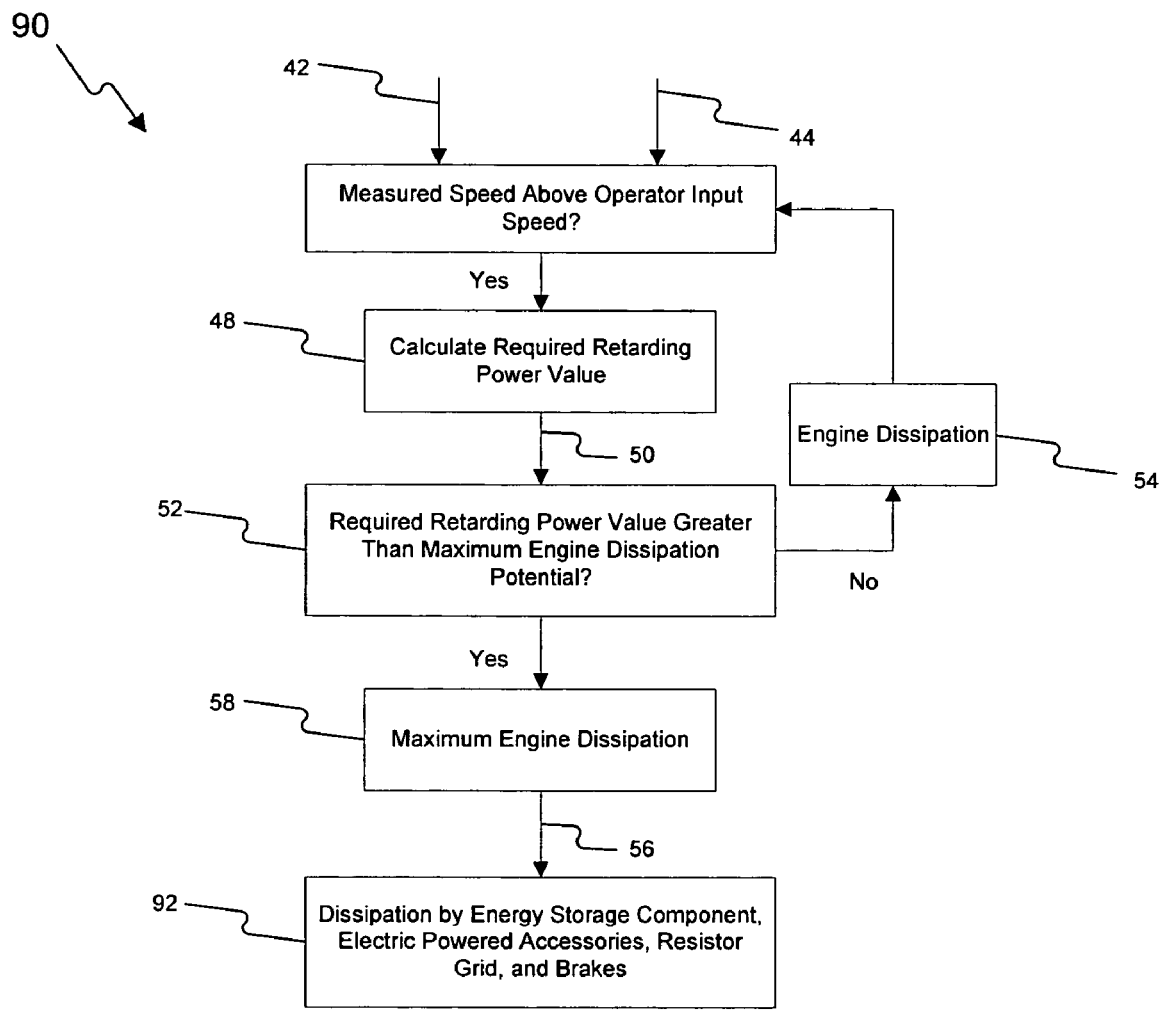
FIG. 3 is a flow diagram illustrating another exemplary retarding strategy of the present disclosure.

FIG. 3 illustrates an another exemplary embodiment of the present disclosure. FIG. 3 includes a retarding strategy 90 similar to the retarding strategy 40 of FIG. 2, except that dissipation by the electric powered accessories 30, energy storage component 28, resistive grid 24, and brakes 34 are provided substantially simultaneously (box 92 of FIG. 3).

It is noted that numerous other retarding strategies may be used in accordance with the present disclosure. For example, a retarding strategy may include dissipating power by the electric powered accessories 30 and/or the energy storage component 28 prior to dissipation by the internal combustion engine 14, or dissipating power by the resistive grid 24 prior to dissipation by the electric powered accessories 30 and/or the energy storage component 28. Additionally, it is understood that the retarding strategies disclosed may be used with the any type of electric drive configuration known in the art in addition to the series hybrid type electric drive illustrated in FIG. 1. For example, the retarding strategies disclosed may be used with a parallel hybrid type electric drive. Further, it is appreciated that the concepts behind the retarding strategies disclosed may be readily modified for use with a hydrostatic transmission system, or other hydrostatic configurations.

INDUSTRIAL APPLICABILITY

The retarding strategies 40, 90 for the propelled machine 10 according to the present disclosure provide for substantially complete utilization of the propelled machine 10 in dissipating undesired power. As noted, power is dissipated by the internal combustion engine 14, a resistive grid 24, electric powered accessories 30, energy storage components 28, and brakes 34. Accordingly, greater fuel efficiency is achieved by way of reducing the need for fuel in the internal combustion engine 14 when the engine 14 is being driven by the electric generator 16. Further, spreading the power dissipation among the several components of the propelled machine 10 increases the life of each of the power dissipating devices, including the brakes 34.

Additionally, the retarding strategies 40, 90 of FIGS. 2 and 3 allow the internal combustion engine 14 engine to dissipate power up to its speed limit before requiring power dissipation from another device. This ensures the maximum fuel savings. Additionally, placing the brakes as the last power dissipating device in the hierarchy of dissipating devices provides the brakes 34 with minimum wear due to retarding. Finally, the use of energy storage component 28 provides for future beneficial use of the retarding power.

Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A method of dissipating power in a propelled machine having an electric drive, comprising:
   converting undesired power to electric power by the electric drive; and
   driving an internal combustion engine with at least a portion of the electric power prior to substantially dissipating power with a resistive grid by providing at least another portion of the electric power to the resistive grid.

2. The method of dissipating power of claim 1, wherein the driving of the internal combustion engine includes driving the engine to a predetermined limit.

3. The method of dissipating power of claim 2, wherein the predetermined limit corresponds to a speed limit of the internal combustion engine.

4. The method of dissipating power of claim 1, further including providing another portion of the electric power to at least one of an energy storage component and an electric powered accessory of the propelled machine.

5. The method of dissipating power of claim 4, further including dissipating undesired power by an application of at least one brake of the propelled machine.

6. The method of dissipating power of claim 1, wherein the providing of the another portion of the electric power to a resistive grid includes providing electric power to a predetermined limit.

7. The method of dissipating power of claim 6, wherein the predetermined limit corresponds to a temperature limit of the resistive grid.

8. The method of dissipating power of claim 1, further including dissipating undesired power by an application of at least one brake of the propelled machine.

9. The method of dissipating power of claim 1, further including simultaneously providing another portion of the electric power to at least one of an energy storage component and an electric powered accessory of the propelled machine, and the resistive grid, and dissipating undesired power by an application of at least one brake of the propelled machine.

10. A method of dissipating power in a propelled machine having an electric drive, comprising:
converting undesired power to electric power by the electric drive;
driving an internal combustion engine with at least a first portion of the electric power;
providing a second portion of the electric power to a resistive girid, the second portion corresponding to at least a portion of electric power exceeding a predetermined dissipation limit of the internal combustion engine; and
dissipating undesired power by an application of at least one brake of the propelled machine.

11. The method of dissipating power of claim 10, wherein the predetermined dissipation limit corresponds to a speed limit of the internal combustion engine.

12. The method of dissipating power of claim 10, further including providing a third portion of the electric power to both an energy storage component and an electric powered accessory of the propelled machine.

13. The method of dissipating power of claim 10, wherein the providing of the second portion of the electric power to the resistive grid includes providing electric power to a predetermined limit.

14. The method of dissipating power of claim 13, wherein the predetermined limit corresponds to a temperature limit of the resistive grid.

15. The method of dissipating power of claim 12, wherein the dissipation of undesired power by an application of at least one brake of the propelled machine occurs substantially simultaneously with said providing of a third portion of the electric power to at least one of an energy storage component and an electric powered accessory of the propelled machine.

16. A method of dissipating undesired power in a propelled machine having an electric drive, comprising:
driving an internal combustion engine by the undesired power;
providing undesired power to at least one of an energy storage component and an electric powered accessory of the propelled machine;
providing undesired power to a resistive grid after the driving an internal combustion engine by the undesired power reaches a maximum limit; and
applying at least one brake of the propelled machine.

17. The method of dissipating undesired power of claim 16, further including providing undesired power to both an energy storage component and an electric powered accessory of the propelled machine.

18. The method of dissipating undesired power of claim 16, wherein the driving of the internal combustion engine includes generating electrical power from the undesired power and sending the electrical power to a reversible generator for driving the internal combustion engine.

19. The method of dissipating undesired power of claim 18, wherein the generated power is supplied to a DC bus prior to sending to the internal combustion engine.

20. The method of dissipating undesired power of claim 16, wherein the providing of undesired power to at least one of an energy storage component and an electric powered accessory includes generating electrical power from the undesired power and sending the electrical power to said at least one energy storage component and electric powered accessory.

21. The method of dissipating undesired power of claim 20, wherein the generated power is supplied to a DC bus prior to sending to at least one of the energy storage component and electric powered accessory.

22. A propelled machine, comprising:
a first means for dissipating undesired power, including an engine means;
a second means for dissipating undesired power, including a resistive grid;
a third means for dissipating undesired power, including a brake means;
an electric drive; and
a controller configured to prioritize the use of one of the first, second, and third dissipating means so that the dissipating means having the highest priority dissipates power to a predetermined limit if more than one dissipating means is required, wherein the first dissipating means has a first priority, the second dissipating means has a second priority, and the third dissipating means has a third priority.

* * * * *

UNITED STATES PATENT AND TRADEMARK OFFICE
CERTIFICATE OF CORRECTION

PATENT NO. : 6,986,727 B2
DATED : January 17, 2006
INVENTOR(S) : Brian D. Kuras et al.

It is certified that error appears in the above-identified patent and that said Letters Patent is hereby corrected as shown below:

Column 9,
Line 25, delete "girid" and insert -- grid --.

Signed and Sealed this

Sixteenth Day of May, 2006

JON W. DUDAS
*Director of the United States Patent and Trademark Office*